(12) United States Patent
Schermerhorn et al.

(10) Patent No.: US 9,959,551 B1
(45) Date of Patent: May 1, 2018

(54) CUSTOMER-LEVEL CROSS-CHANNEL MESSAGE PLANNER

(71) Applicant: Amazon Technologies, Inc., Seattle, WA (US)

(72) Inventors: Charles Porter Schermerhorn, Seattle, WA (US); David John Edwards, Jr., Woodinville, WA (US); Tegdeep Kondal, Seattle, WA (US); Donald Arthur Parsons, Seattle, WA (US); Nisarg Shah, Redmond, WA (US); Vishal Mangesh Shanbhag, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 660 days.

(21) Appl. No.: 14/575,999

(22) Filed: Dec. 18, 2014

(51) Int. Cl.
| | |
|---|---|
| *G06F 15/18* | (2006.01) |
| *G06Q 30/02* | (2012.01) |
| *G06N 99/00* | (2010.01) |
| *H04L 29/08* | (2006.01) |

(52) U.S. Cl.
CPC ....... *G06Q 30/0244* (2013.01); *G06N 99/005* (2013.01); *G06Q 30/0255* (2013.01); *H04L 67/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,135,607 | B2 * | 3/2012 | Williams | G06Q 30/02 705/7.29 |
| 8,358,771 | B1 * | 1/2013 | Moore | H04M 3/5158 379/265.01 |
| 8,566,152 | B1 * | 10/2013 | Shaw | G06Q 30/02 705/14.1 |
| 8,627,379 | B2 * | 1/2014 | Kokenos | G06Q 30/02 725/34 |
| 8,863,266 | B1 * | 10/2014 | Sanyal | H04L 67/22 726/23 |
| 9,344,371 | B1 * | 5/2016 | Sanyal | H04L 67/22 |
| 9,729,557 | B1 * | 8/2017 | Sanyal | H04L 63/108 |

(Continued)

OTHER PUBLICATIONS

A framework for dealing collaboratively with interactions from social media in emergency situations Danilo P. Freitas; Marcos R. S. Borges; Paulo Victor R. Carvalho 2017 IEEE 21st International Conference on Computer Supported Cooperative Work in Design (CSCWD) Year: 2017 pp. 215-220 IEEE Conferences.*

(Continued)

*Primary Examiner* — Michael B Holmes
(74) *Attorney, Agent, or Firm* — Kilpatrick Townsend & Stockton LLP

(57) ABSTRACT

Techniques for providing a messaging plan may be provided. A message that conforms to a channel agnostic format may be received. In an example, a messaging plan that includes a channel for delivering the message may be determined based at least in part on a score determined by a machine learning module utilizing metrics of a user. The message may be provided to the user according to the messaging plan. The messaging plan may be updated for subsequent messages based at least in part on updated metrics of the user received in response to the user interacting with the message.

20 Claims, 9 Drawing Sheets

(56) References Cited

U.S. PATENT DOCUMENTS

| | | | |
|---|---|---|---|
| 9,805,177 B1* | 10/2017 | Chakravarthy | G06F 21/31 |
| 2007/0038567 A1* | 2/2007 | Allaire | G06Q 30/0239 |
| | | | 705/50 |
| 2011/0161165 A1* | 6/2011 | Gierkink | G06Q 20/102 |
| | | | 705/14.45 |
| 2011/0167456 A1* | 7/2011 | Kokenos | G06Q 30/02 |
| | | | 725/60 |
| 2013/0111500 A1* | 5/2013 | Dixon | G06F 9/546 |
| | | | 719/314 |
| 2013/0198300 A1* | 8/2013 | Briggman | H04L 51/34 |
| | | | 709/206 |
| 2014/0109118 A1* | 4/2014 | Kokenos | G06Q 30/02 |
| | | | 725/5 |

OTHER PUBLICATIONS

Enhanced Channel Access for Connection State of Bluetooth Low Energy Networks Wha Sook Jeon; Dong Geun Jeong IEEE Transactions on Vehicular Technology Year: 2017, vol. 66, Issue: 9 pp. 8469-8481 IEEE Journals & Magazines.*

DF Relaying Networks With Randomly Distributed Interferers Xiazhi Lai; Wanxin Zou; Dongqing Xie; Xutao Li; Lisheng Fan IEEE Access Year: 2017, vol. 5 pp. 18909-18917 IEEE Journals & Magazines.*

Adaptive Base Station Cooperation for Physical Layer Security in Two-Cell Wireless Networks Lin Hu; Hong Wen; Bin Wu; Jie Tang; Fei Pan IEEE Access Year: 2016, vol. 4 pp. 5607-5623 IEEE Journals & Magazines.*

The Cross-Channel Marketing Platform. [online]. Experian Information Solutions, Inc., 2014 [retrieved on Oct. 28, 2014]. Retrieved from the Internet: <URL: http://www.experian.com/marketing-services/cross-channel-marketing-platform.html >.

* cited by examiner

CUSTOMER-LEVEL CROSS-CHANNEL MESSAGE PLANNER

BACKGROUND

Current network technologies provide a number of beneficial commodities to users of the Internet and other networks. For example, users are able to search, view, and purchase a number of products from electronic marketplaces, communicate with other users on the other side of the world, or play a number of games with other users via the Internet. However, current network technologies also create several problems for users, such as spamming messages or constant inappropriate advertisements directed to the user as they browse the Internet. Users may also be subject to notifications associated with services or products they have recently interacted with that are received at inconvenient times or with an increased frequency that results in annoying the intended audience. While some of the notifications or messages may be appropriate or useful to the user, the sheer amount of messages provided at inconvenient times may result in the user being disengaged and missing opportunities that they would otherwise find helpful.

BRIEF DESCRIPTION OF THE DRAWINGS

Various embodiments in accordance with the present disclosure will be described with reference to the drawings, in which.

DETAILED DESCRIPTION

Figure 1:
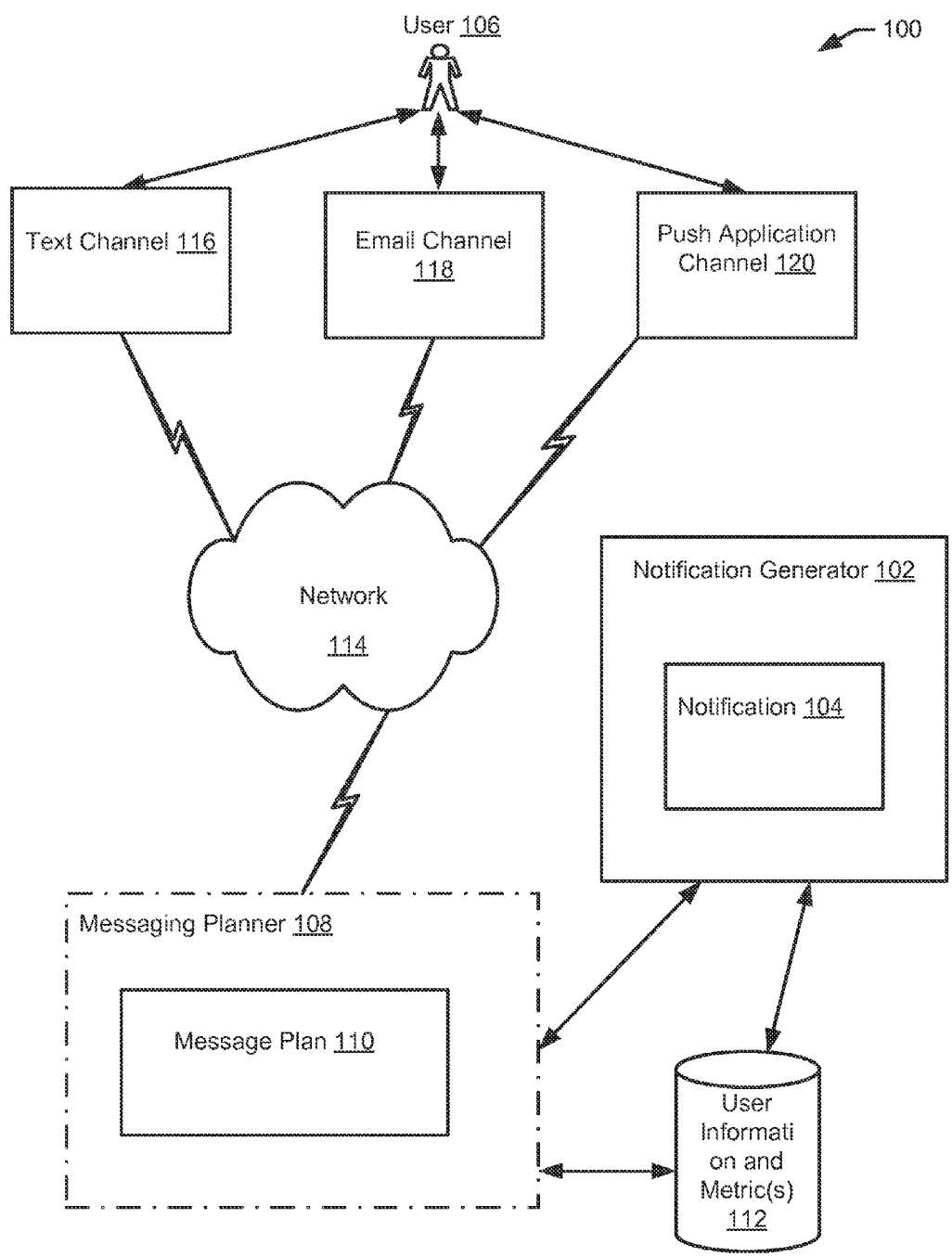
FIG. 1 is a block diagram depicting an example networked operating environment in which an illustrative message planner may be implemented in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems, methods, and non-transitory computer-readable media for implementing a message planner that provides for strategic and efficient delivery of electronic messages to users. In accordance with at least one embodiment, the message planner may provide electronic messages or notifications (referred to herein interchangeably as "notifications") to a user via a determined channel and at a time that may increase user engagement with the notifications. The message planner may utilize information about a particular user to provide notifications to the user that are appropriate, via a preferred channel, and at a preferred time of day, thus reducing notification clutter and ensuring that more relevant content may be provided to the particular user. A channel as described herein may include an email, a short message service (SMS), a telephone or mobile telephone, mobile or stand-alone application channel or any suitable communication method for providing notifications to a user via one or more networks. In accordance with at least one embodiment, the message planner may use explicit user preferences, implicit user preferences, and other information about a particular user to determine the appropriate notifications and an appropriate message delivery plan. Explicit user preferences can include preferences communicated by the particular user via a user interface (UI), such as times of day that they do not wish to receive notifications, or preferred channels of delivery of particular notifications. Implicit user preferences can include any user preference related to a notification that can be learned by a machine learning module analyzing a particular user's engagement with notifications including the time of day that the user does or does not engage with a notification, and via what channel the user does or does not engage with the notification. The implicit user preferences can dynamically update based on user feedback including the user's interaction with notifications that are provided to them, thus creating a closed loop method of creating and implementing a message plan for notifications that can be particularized and updated for a particular user.

In a non-limiting example, a user may explicitly communicate that they wish to receive notifications regarding accessories related to a recently purchased mp3 player from an electronic marketplace during evening hours. The message planner may receive a notification, generated by a computer system associated with the electronic marketplace, about newly released headphones for the mp3 player. The message planner may receive and analyze the notification for relevancy to the user and to determine a cross-channel messaging plan for the notification. For example, the notification may be analyzed to determine if the user has recently received similar notifications. Once the notification has been analyzed, the message planner may determine the cross-channel messaging plan for the notification based at least in part on an engagement score derived by a machine learning module. The cross-channel messaging plan may detail particular channels, delivery times for each channel, and an expiration time for providing the notification about the headphones to the particular user based on the explicit user preferences and the determined engagement score. The message planner may then provide the notification via the appropriate channels and receive user metrics from the user to update the cross-channel messaging plan and the engagement score for the particular user. For example, the message planner may utilize information about the particular channel, and that the user engaged with the notification, to update the engagement score for the particular user. The message planner may utilize updated user metrics for subsequent notifications intended for the particular user.

In an embodiment, a machine learning module may utilize the explicit and implicit preferences of the user along with information about the user from the electronic marketplace to determine a score or engagement score. Information about the user from an associated electronic marketplace may include at least a purchase history of the user, browsing history of the user, information about the time periods and length of browsing time in the electronic marketplace, and other associated data that can be gathered about the user from the electronic marketplace. The engagement score may represent how successful the notification will be in engaging the user in a given channel. The message planner may score the combination of each channel and notification and select one or more channels for providing the notification based on the score meeting or exceeding a threshold for each channel. In an example, the message planner may provide the notification to each channel as determined by the score along with times of delivery that should be followed by the channels. The message planner and the machine learning module may update the cross-channel messaging plan for a user based on feedback or metrics from the user including whether they engaged with the notification, which channel they engaged with the notification, and at what time they engaged with the notification. A cross-channel messaging plan may specify a channel selection and/or schedule for sending electronic messages to a user via a plurality of messaging channels at the same time or at varied times up to an expiration time period. Metrics and feedback from the user can be weighted based on the type of notification and the engagement level of the user. For example, certain metrics may be gathered when the notification is merely an informative message to join a program or view a network page versus a notification that provides the capability of a user to purchase or order an item associated with an electronic marketplace.

In accordance with at least one embodiment, the message planner may be configured to prioritize certain notifications or messages for delivery to a user despite explicit communication preferences or the determined engagement score. For example, a notification about a canceled order or returned item may be deemed of sufficient priority by the electronic marketplace for immediate delivery to the user despite explicit preferences otherwise. In some embodiments, a cross-channel or multi-channel plan may be determined by the message planner that details delivering the notification via a plurality of channels, at varied times to avoid overlap, up to an expiration time period for the notification. A notification or message may have a previously specified expiration, such as a time limited offer notification, or an expiration time determined by the message planner according to explicit/implicit user preferences. In some embodiments, the machine learning module and message planner may utilize implicit preferences and information of users that are similar to the particular user for determining the cross-channel message plan. Obtaining information from similar users can be useful for new users or for users that have little to no interaction with particular channels.

FIG. 1 is a block diagram 100 depicting an example networked operating environment in which an illustrative message planner may be implemented. In accordance with at least one embodiment, a notification generator 102 may generate a notification 104 intended for a user 106. A notification generator 102 may be associated with an electronic marketplace and further may include an email, SMS, mobile or stand-alone push application, or advertisement generation system that automatically generates notifications intended for users. The notification 104 may include an informational message intended to inform the user 106 about a new product or service associated with the electronic marketplace, be configured to allow the user 106 to order or purchase an item or service associated with the electronic marketplace, or be configured to receive user input regarding activities associated with the electronic marketplace such as informational polls or verifying user information messages. The notification generator 102 may provide the notification 104 to the message planner 108 for determining a message plan 110 for the user 106. As described above, the message plan 110 may specify channels and times to provide the notification 104 to the user 106.

In accordance with at least one embodiment, the messaging planner 108 may generate the message plan 110 for the user 106 based at least in part on explicit and implicit user preferences as well as other information about the user 106. In an embodiment, the preferences and information may be stored in a data store 112 associated with the notification generator 102. In an embodiment, the notification 104 may be provided to the user 106 according to the message plan 110 via one or more networks 114 by a plurality of channels including a text channel 116, an email channel 118, and a push application channel 120. The message plan 110 may indicate that the notification 104 should be provided to the user 106 via the text channel 116 first for a specified time period, followed by the email channel 118 for a specified time period, and finally by the push application channel 120 for a specified time period up to an expiration time period. In accordance with at least one embodiment, the message plan 110 may specify that the notification 104 should only be provided to the user 106 via one channel, such as the text channel 116, or that the notification should not be provided to the user at all. In accordance with at least one embodiment, the messaging planner 108 may receive user metrics from the user 106 engaging or interacting with the notification. The user metrics may be stored in the data store 112 and may be utilized for updating the message plan for subsequent messages intended for user 106.

Figure 2:
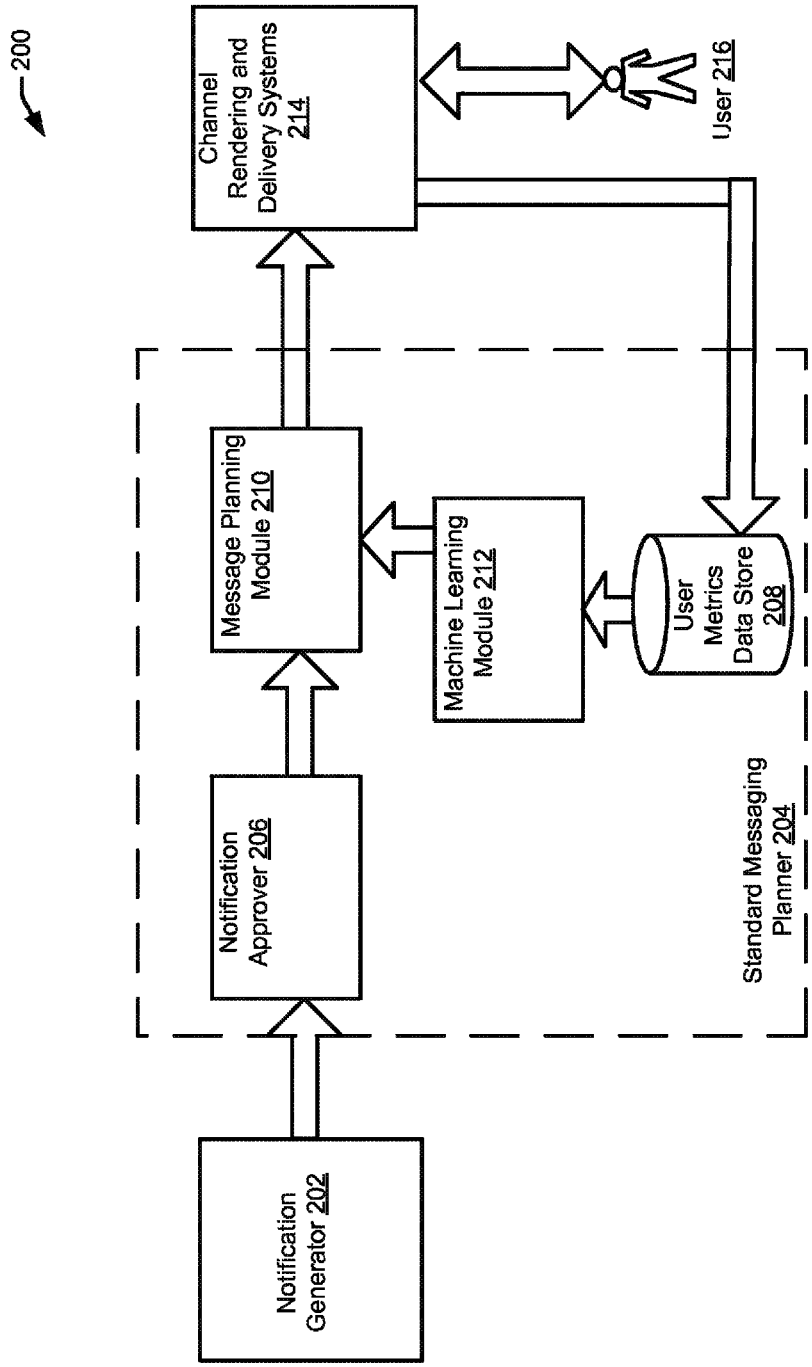
FIG. 2 is a block diagram depicting implementation of the message planner in accordance with at least one embodiment.

FIG. 2 is a block diagram 200 depicting implementation of the message planner in accordance with at least one embodiment. As illustrated in FIG. 2, the notification generator 202 may generate and provide a notification to the standard messaging planner 204 and more specifically to the notification approver 206. In accordance with at least one embodiment, the notification generator 202 generates a channel agnostic notification. This allows for a plurality of notification generators to concentrate on generating high quality content without taking into account the specifics of ensuring that the notification can be properly communicated via a particular channel. As described herein, a channel agnostic notification may be a notification that conforms to a standard data schema that can aid in translating the notification into a channel specific format or that does not prevent the translation of the notification to a particular format. In an embodiment, the standard messaging planner 204 may require that the notification generator 202 generate notifications according to a standard data schema including user identification information, start time period for the notification, expiration time period for the notification, topics or type of information included in the notification, and/or associated metadata that may include more detailed specifics about the notification such as value or category of the item included in the notification. The standard data schema or channel agnostic notification may also include electronic marketplace attributes such as customer segmentation information (active high-value customer or not very active low-value customer), a reason attribute (what was the particular item the user viewed/purchased/liked that triggered a notification generator), number of views of given product or item included in the notification, a product category for which the notification is generated, a promotional coupon code, an experiment treatment identifier for a notification that is part of an A/B test, or a string identifier used to retrieve any specific string to include in the message or notification. The notifications generated by the notification generator 202 may be provided to the standard messaging planner 204 by a standard application programming interface (API). While FIG. 2 illustrates the notification generator 202 as being a separate component and decoupled from the standard messaging planner 204, the notification generator 202 may be implemented within or be coupled to the standard messaging planner 204 in some embodiments.

In accordance with at least one embodiment, the notification approver 206 may analyze the notification for relevance to a user and to determine if similar content has already been provided to the user. If the notification is deemed not relevant to the user, based on user information associated with the electronic marketplace, or the user has recently received similar notifications, the notification will not be provided to the user. In an embodiment, the standard messaging planner 204 may temporarily or permanently store recent topics or information about the content of a notification recently sent to a user in the user metrics data store 208 to determine frequency of similar notifications sent to a user. The standard messaging planner 204 or message planning module 210 may dynamically update the frequency with which similar content may be provided to a user based on explicit/implicit user preferences and other information about the user that can be obtained from the associated electronic marketplace. Once a notification has been approved by the notification approver 206, the notification may be provided to the message planning module 210. In accordance with at least one embodiment, the message planning module 210 may generate or determine a cross-channel messaging plan for providing the notification to a particular user.

The message planning module 210 may utilize an engagement score determined by the machine learning module 212 to identify which channels and during what time periods in those channels that a user is most likely to engage with the notification. In some embodiments, the message planning module 210 may utilize a threshold for each channel or notification to determine whether a channel is appropriate for sending the notification through. For example, the message planning module 210 may select a particular channel for providing the notification if it is not expressly blocked by the user (explicit user preferences) and if the engagement score exceeds a specified threshold. Thresholds may vary for notification or channel types. For example, the threshold may be specified at a higher range for a channel that requires a pre-purchase of space, such as a displayed advertisement, as opposed to a lower threshold for a notification that may be sent via an email channel. After the message planning module 210 has determined the cross-channel message plan, the message planning module 210 may provide the notification to a channel rendering and delivery system 214.

In accordance with at least one embodiment, the message planning module 210 may provide the notification to a channel notification queue (not pictured) that can hold the notifications until the channel rendering and delivery system 214 can pull the notification for provision to the user 216 (e.g., via a computing device utilized by the user 216). In some embodiments, the message planning module 210 provides the notification to the channel rendering and delivery systems 214 for immediate delivery to the user 216. As described above, certain notifications or messages may have a higher priority than other notifications and they will be provided to the appropriate channel rendering and delivery system 214 without consideration of the engagement score or explicit user preferences (such as fraud detection notifications). In accordance with at least one embodiment, the notification approver 206 or the message planning module 210 may be configured to receive and analyze one or more notifications or messages targeted for a particular user. The one or more messages received and intended for the particular user may all be relevant and thus compete to be provided to the user or included in the message plan for the user. Messages that are determined to be more relevant, as described herein, may be selected for provision via a message plan, while the less relevant messages will be maintained and postponed until a time period corresponding to the expiration time associated with the message has passed. Postponed messages may be utilized in further message plan determinations and may be included in the subsequent message plans based on its relevancy to the particular user. However, if the expiration period for the message passes, then the message may never be provided to the user despite its relative relevancy. In accordance with at least one embodiment, the channel rendering and delivery systems 214 are configured to translate or render the notification into a channel specific format for delivery corresponding to the selected channel and providing the notification to the user 216 via that channel.

In accordance with at least one embodiment, the channel rendering and delivery systems 214 may be configured to receive user metrics of the user 216 or updated user metrics of the user in response to the user engaging with the notification. These updated metrics can be provided by the particular channel rendering and delivery systems 214 to the machine learning module 212 or to the user metrics data store 208. The updated metrics can be accessed and utilized by the machine learning module 212 to update the user's engagement score for subsequent notifications/channels. Examples of updated/user metrics include impressions, click-through rates or information, conversion information for item orders/purchases, or any suitable value information that may be obtained from a notification associated with an electronic marketplace. The channel rendering and delivery systems 214 may provide the updated/user metrics to the data store 208 via an API. The feedback from the user 216 can be utilized to drive the machine learning module 212 and thus create a closed-loop feedback system that learns a user's implicit preferences regarding notification times and channels.

The machine learning module 212 may utilize any suitable machine learning technique to identify implicit user preferences and/or derive engagement scores including supervised learning, unsupervised learning, reinforcement learning, and suitable combinations thereof. User preferences may be classified and the machine learning module 212 may associate defined preference categories with user activity utilizing one or more trained classifiers such as linear classifiers, support vector machines, Bayesian classifiers, boosting classifiers, decision trees and/or neural networks. Preference classes need not be pre-defined, for example, implicit preference classes may be identified with a suitable pattern recognition and/or clustering analysis technique including hierarchical clustering, centroid-based clustering such as k-means clustering, distribution-based clustering such as Gaussian clustering, density-based clustering, and suitable combinations thereof, in any suitable parameter and/or vector space with any suitable number of dimensions. Engagement scores may be derived and/or estimated with any suitable regression technique including logistic regression such as multinomial logistic regression, Bayesian regression such as Bayesian linear regression, nonlinear regression, nonparametric regression, and suitable combinations thereof, with respect to any suitable scoring function, relation and/or model.

Figure 3:
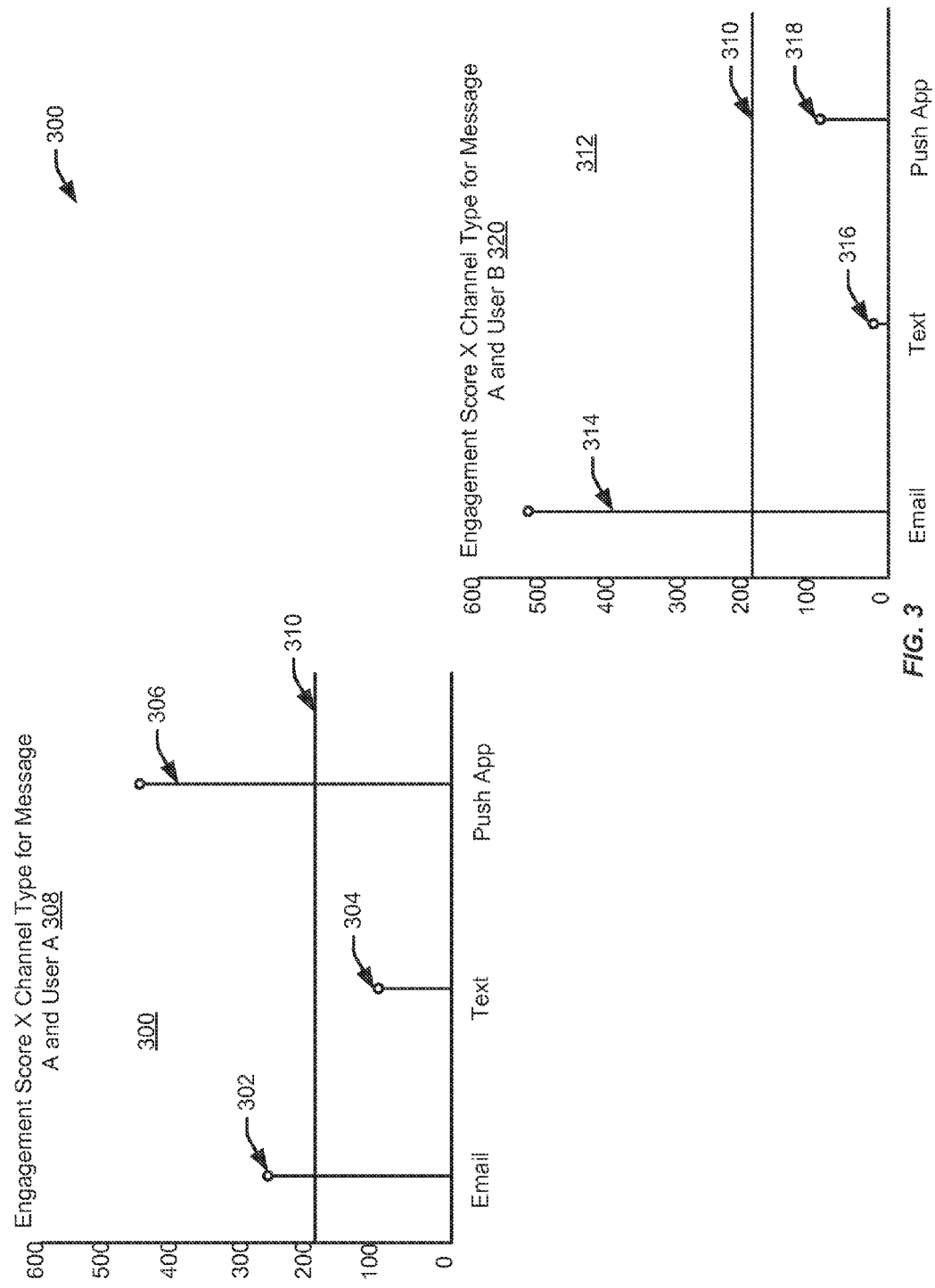
FIG. 3 includes several example graphs illustrating users' engagement scores for interacting with a particular message given several example delivery channels by the message planner in accordance with at least one embodiment.

FIG. 3 includes several example graphs illustrating users' engagement scores for interacting with a particular message given several example channels in accordance with at least one embodiment. Example graph 300 in FIG. 3 illustrates several determined engagement scores 302-306 represented on the graph 300 for Message A and User A 308 with engagement scores represented on a Y-axis and various channels represented on an X-axis of the graph 300. Graph 300 also includes a representation of a threshold 310. As described herein, the message planner may utilize a machine learning module to determine an engagement score for a notification/message for a user. The message planner may select the appropriate channels for providing the notification to a user based at least in part on a determined engagement scores 302-306 exceeding the threshold 310. The engagement scores 302-306 and threshold 310 represent an interpretation of the process for selecting the appropriate channels for delivery. In the present graph 300, the message planner may select the email and push application channels for providing the notification because they satisfy the threshold, but not select the text channel as the engagement score does not satisfy the threshold. As described herein, the engagement scores 302-306 may be determined by the machine learning module utilizing user A's explicit/implicit user preferences and other information about the user.

Example graph 312 in FIG. 3 illustrates several determined engagement scores 314-318 represented on the graph 312 for Message A and User B 320 with engagement scores represented on a Y-axis and various channels represented on an X-axis of the graph 312. Graph 312 includes the same threshold 310 as represented in graph 300, but with different determined engagement scores as represented in 314-318. In the graph 312, the message planner may select email as an appropriate channel for providing the notification because the engagement score 314 satisfies the threshold 310, but may not select the text 316 and push app 318 channels as their engagement scores do not satisfy the threshold 310. The engagement scores 314-318 may also be updated based on user metrics in response to the user engaging or not engaging with the notification provided via the selected channels for subsequent messages similar to Message A. Graph 312 aids in illustrating how engagement scores determined for different users, but with reference to the same notification, can result in different channels being selected for providing the notification. Thus, the message planner may be utilized to provide notifications that are particularized for a user and the user's preferences. In accordance with at least one embodiment, the threshold level 310 may be dynamically updated by the message planner based on information associated with the notification, channel, or user.

Figure 4:
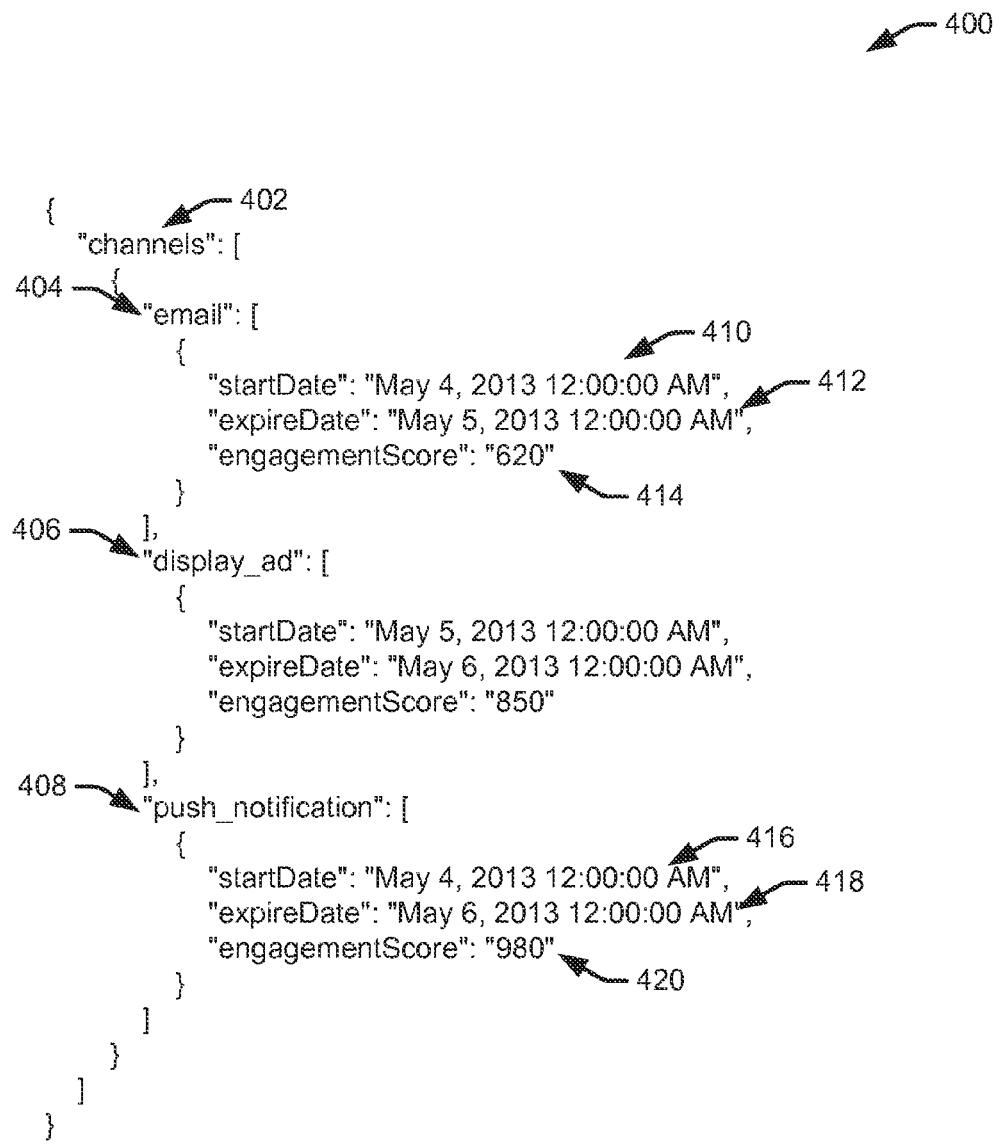
FIG. 4 illustrates a programmatic example of a messaging plan as determined by the message planner in accordance with at least one embodiment.

FIG. 4 illustrates a programmatic example of a messaging plan 400 as determined by the message planner in accordance with at least one embodiment. The messaging plan 400 may include determined channels 402. The messaging plan 400 in FIG. 4 includes three specific channels: an email channel 404, a display advertisement channel 406, and a push notification channel 408. Each channel 404-408 includes a start date 410 for providing the notification via the channel (404), an expire date 412 which identifies when to stop providing the notification via the channel (404), and a determined engagement score 414 which represents the potential for the user to engage with the notification via the channel 404.

As described herein, the engagement score may be determined by a machine learning module utilizing the user's explicit/implicit preferences and other information obtained about the user from an associated electronic marketplace. The channel 408 includes a similar start date 416 as the start date 410 for channel 404. However, the expire date 418 for channel 408 is different than the expire date 414. Additionally, the engagement score 420 of channel 408 is higher than the engagement score 414 for channel 404. In accordance with at least one embodiment, the higher the engagement score the more likely the user is to engage with the notification provide via the channel during that time period. In some embodiments, a higher engagement score will correlate to a longer time period between the start date and expire date. In other embodiments, no correlation exists between the engagement score and the length of time that a notification will be provided to a user. Instead, the machine learning module can utilize the same parameters for the engagement score for determining the start date and expire date for a notification to be provided via a selected channel.

Figure 5:
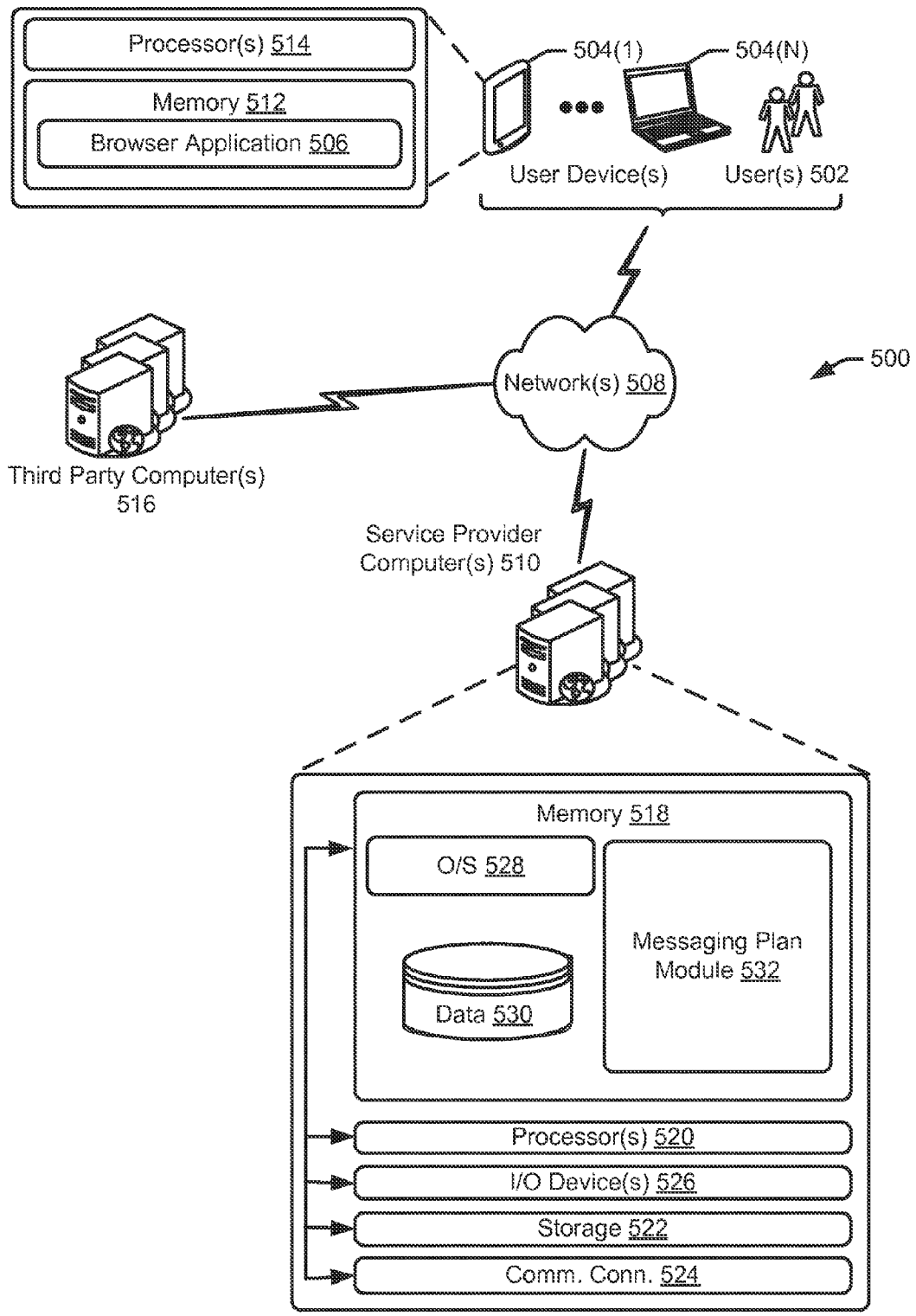
FIG. 5 is a block diagram depicting an example computing architecture for implementing the message planner in accordance with at least one embodiment.

FIG. 5 is a block diagram depicting an example computing architecture 500 for implementing a message planner in accordance with at least one embodiment. The example computing architecture 500 includes one or more service provider computers and/or a user device connected via one or more networks in accordance with at least one embodiment. In computing architecture 500, one or more users 502 may utilize user computing devices 504(1)-(N) (collectively, user devices 504) to access a browser application 506 (e.g., a web browser) or a user interface (UI) accessible through the browser application 506, via one or more networks 508 to receive a notification or message provided in part by the message planner as described herein. The browser application 506 can be any browser control or native application that can access and display a network page or other information. In some embodiments, the user computing device 504 may be configured to receive notifications and provide user metrics via some other channel such as a mobile phone displaying a SMS text. In some aspects, the browser application 506 may display an interactive UI for providing explicit user preferences or for providing a notification from a notification generator as described above. In some aspects, the browser application 506 may be hosted, managed, and/or provided by a computing resources service or service provider, such as by utilizing one or more service provider computers 510 that are associated with or configured to enable the message planner. The one or more service provider computers 510 may, in some examples, provide computing resources such as, but not limited to, client entities, low latency data storage, durable data storage, data access, management, virtualization, hosted computing environment or "cloud-based" software solutions, electronic content performance management, etc. The one or more service provider computers 510 may also be operable to provide hosting services, computer application development, and/or implementation platforms, combinations of the foregoing, or the like to the one or more users 502.

In one illustrative configuration, the user computing devices 504 may include at least one memory 512 and one or more processing units or processor(s) 514. The user devices 504 may also include geo-location devices (e.g., a global positioning system (GPS) device or the like) for providing and/or recording geographic location information associated with the user devices 504.

The memory 512 may store program instructions that are executable by the processor(s) 514, as well as data generated during the execution of these programs. Depending on the configuration and type of user device 504, the memory 512 may be volatile (such as random access memory (RAM)) and/or non-volatile (such as read-only memory (ROM), flash memory, etc.). The user device 504 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 512 may include multiple different types of memory, such as static random access memory (SRAM), dynamic random access memory (DRAM), or ROM.

Turning to the components of the memory 512 in more detail, the memory 512 may include an operating system and one or more application programs or services for implementing the features disclosed herein including providing a notification to the user 502 via the browser application 506, dedicated applications (e.g., smart phone applications, tablet applications, etc.), or through capabilities inherit to a device (e.g., SMS text or voicemail for a mobile phone). The browser application 506 may be configured to provide or display a notification intended for the user 502 via the one or more service provider computers 510 and display a user friendly UI for receiving explicit user preferences as described above. Additionally, the memory 512 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user 502 provided response to a security question or a geographic location obtained by the user device 504.

In some examples, the networks 508 may include any one or a combination of many different types of networks, such as cable networks, the Internet, wireless networks, cellular networks, satellite networks and other private and/or public networks, or combinations thereof. While the illustrated example represents the users 502 accessing the browser application 506 over the networks 508, the described techniques may equally apply in instances where the users 502 interact with the one or more service provider computers 510 via the one or more user devices 504 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

As described briefly above, the browser application 506 may allow the users 502 to interact with a notification provided by the one or more service provider computers 510 for executing the message planner as describe herein. The one or more service provider computers 510, perhaps arranged in a cluster of servers or as a server farm, may host the browser application 506 and/or cloud-based software services. Other server architectures may also be used to host the browser application 506 and/or hosted computing environment services. The browser application 506 may be capable of handling requests from many users 502 and serving, in response, various user interfaces that can be rendered at the user devices 504 such as, but not limited to, a network site or network page. The browser application 506 can interact with any type of network site that supports user interaction, including social networking sites, electronic retailers, informational sites, blog sites, search engine sites, news and entertainment sites, and so forth. The described techniques can similarly be implemented outside of the browser application 506, such as with other applications running on the user device 504.

The one or more service provider computers 510 may be any type of computing device such as, but not limited to, a mobile phone, a smart phone, a personal digital assistant (PDA), a laptop computer, a desktop computer, a server computer, a thin-client device, a wearable computing device, a tablet PC, etc. Additionally, it should be noted that in some embodiments, the one or more service provider computers 510 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 510 may be in communication with the user device 504 via the networks 508, or via other network connections. The one or more service provider computers 510 may include one or more servers, perhaps arranged in a cluster or as individual servers not associated with one another. The one or more service provider computers 510 may be in communication with one or more third party computers 516 via networks 508. The one or more service provider computers 510 that host the browser application 506 may obtain and provide data to third party computers 516 via networks 508 in accordance with embodiments described herein. The one or more third party computers 516 may be provided notifications to be displayed or further provided to a user 502 through other browser applications or dedicated applications. For example, the message planner implemented by the one or more service provider computers 510 may provide a notification to a channel that includes a display advertisement channel implemented by a third party computer. Additionally, the third party computers 516 may be configured to provide user metrics or updated information about the user in response to the user engaging or not engaging with the notification provided via a channel implemented by the third party.

In one illustrative configuration, the one or more service provider computers 510 may include at least one memory 518 and one or more processing units or processors(s) 520. The memory 518 may store program instructions that are loadable and executable on the processor(s) 520, as well as data generated during the execution of these programs. Depending on the configuration and type of the one or more service provider computers 510, the memory 518 may be volatile (such as RAM) and/or non-volatile (such as ROM, flash memory, etc.). The one or more service provider computers 510 or servers may also include additional storage 522, which may include removable storage and/or non-removable storage. The additional storage 522 may include, but is not limited to, magnetic storage, optical disks and/or tape storage. The disk drives and their associated non-transitory computer-readable media may provide non-volatile storage of computer-readable instructions, data structures, program modules, and other data for the computing devices. In some implementations, the memory 518 may include multiple different types of memory, such as SRAM, DRAM, or ROM.

The memory 518, the additional storage 522, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 518 and the additional storage 522 are all examples of computer storage media. Additional types of computer storage media that may be present in the one or more service provider computers 510 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more service provider computers 510. Combinations of any of the above should also be included within the scope of computer-readable media.

The one or more service provider computers 510 may also contain communication connection(s) interfaces 524 that allow the one or more service provider computers 510 to communicate with a stored database, another computing device or server, user terminals and/or other devices on the networks 508. The one or more service provider computers 510 may also include I/O device(s) 526, such as a keyboard, a mouse, a pen, a voice input device, a touch input device, a display, speakers, a printer, etc.

Turning to the contents of the memory 518 in more detail and as will be described in further detail in FIG. 6, the memory 518 may include an operating system 528, one or more data stores 530, and/or one or more application programs or services for implementing the features disclosed herein including a messaging plan module 532. In accordance with at least one embodiment, the messaging plan module 532 may be configured to receive a notification provided by a notification generator, analyze the notification for relevancy and frequency of similar content provided to a particular user, determine a message plan for the notification based at least in part from an engagement score derived by a machine learning module utilizing implicit/explicit user preferences and other user information, provide the notification to selected channels based on the message plan, and receive user metrics or updated user information to update/alter the message plan and engagement score for the user that can be used to analyze subsequent notifications intended for the user.

Figure 6:
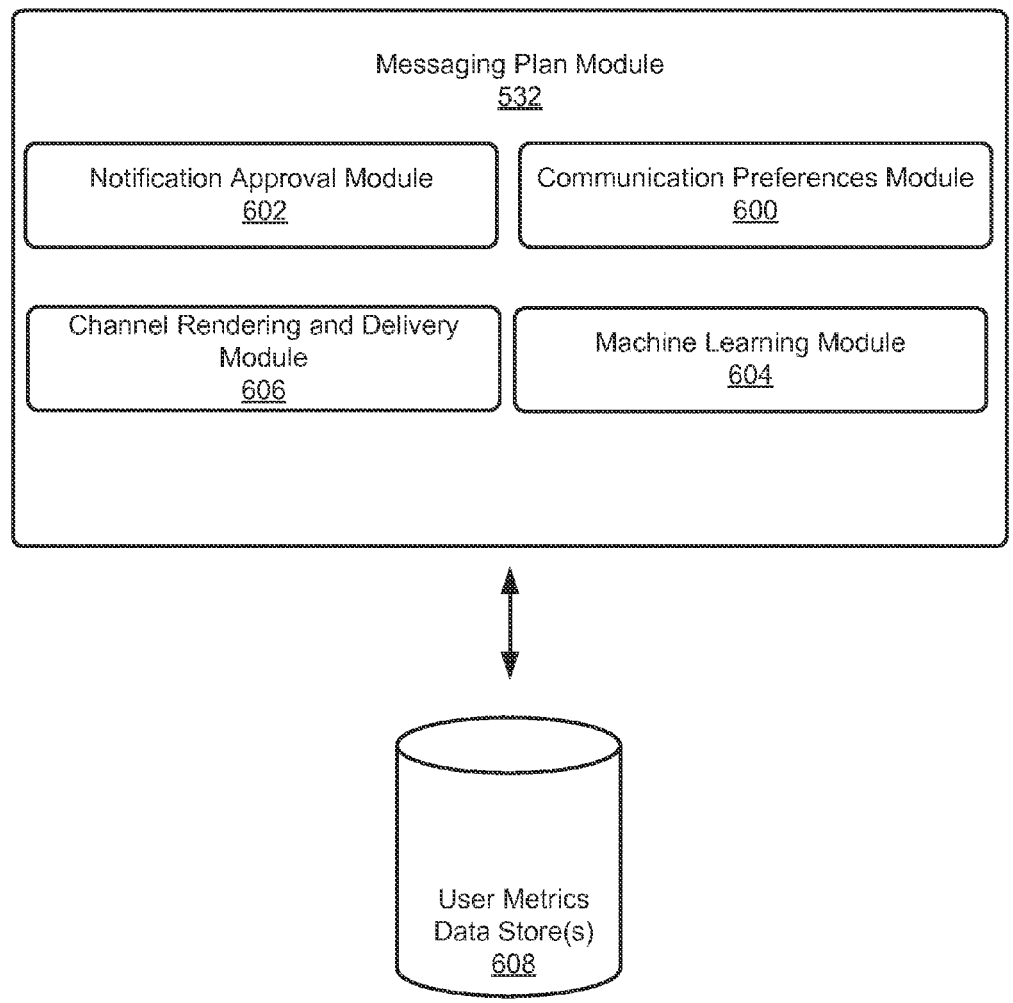
FIG. 6 is a block diagram depicting an example messaging plan module for implementing the message planner and associated data stores in accordance with at least one embodiment.

FIG. 6 is a block diagram depicting an example messaging plan module for implementing the message planner, and associated data stores. It should be noted that while multiple (sub)modules are described in the example messaging plan module 532, the processes and methods described herein can be performed by more or less modules within memory such as memory 518 described above. In addition, while the modules 600-606 included in messaging plan module 532 are displayed and described as distinct modules, in some embodiments they may be included within one another to further facilitate methods and systems described herein. In accordance with at least one embodiment, the messaging plan module 532 may include a communication preferences module 600, a notification approval module 602, a machine learning module 604, and a channel rendering and delivery module 606 in communication with one or more data stores 608 (which is an example of the one or more data stores 530 from FIG. 5).

In accordance with at least one embodiment, the communication preferences module 600 may be configured to generate and provide a user interface (UI) that allows a user to specify their explicit user preferences. For example, a user may utilize the UI to indicate particular channels that they favor over other channels and at what times they would like or not like to be bothered by notifications. In an embodiment, the communication preferences module 600 may generate and provide a communication preferences UI that can be interacted by a mobile application or other channel specific mechanisms such as an email unsubscribe link or SMS short-codes. In accordance with at least one embodiment, the user preferences or explicit preferences can be stored in the one or more data stores 608. A user can also specify particular categories and notification types that they would like to receive via the UI provided by the communication preferences module 600. For example, a user may indicate that they would only like to receive notifications related to Electronics or Jewelry categories from an associated electronic marketplace or specify that they do not wish to receive notifications that consist of surveys or request user feedback.

In accordance with at least one embodiment, the communication preferences module 600 and the generated UI may allow a user to specify the preferred channel for certain notifications (such as specifying an email channel for subscription newsletters). The communication preferences module 600 may also be configured to enable a user to temporarily disable notifications from all notification generators by selecting a snooze mode. The snooze mode can be useful for when a user is on vacation and thus does not want to be bothered by notifications. The communication preferences module 600 may also be configured to enable a user (via the generated UI) to specify channel-specific options including frequency and time of delivery for notifications such as a specification to not send more than one notification per day or only send notifications in the afternoon. The communication preferences module 600 may be configured to receive channel specific preferences of a user from the particular channel such as a user opt-out from an email provided by the user clicking on an unsubscribe link provided in the email. The communication preferences module 600 can communicate the user preferences to the messaging plan module 532 for use in determining a cross-channel plan for a notification. The explicit user preferences maintained by the communication preferences module 600 can be updated by the user at any time to reflect a user's changing preferences as notifications are provided to the user.

In accordance with at least one embodiment, the notification approval module 602 may be configured to analyze a received notification for frequency and relevancy to a particular user. The notification approval module 602 may maintain temporary information about the content of previously provided notifications that can be utilized to ensure that similar or competing notifications do not flood the user. The temporary information about the content of the provided notifications can be maintained in the data store 608. The notification approval module 602 allows notification generators to create and provide notifications intended for the user with the assurance that the module 602 will ensure that the user will not become annoyed or disengaged by similar or competing messages being provided to the user within a short time period. The notification approval module 602 may analyze the notification for appropriateness or relevancy to the user by utilizing user information from an associated electronic marketplace (such as purchase history or browsing history) and the content or topic of the notification. In some embodiments, the channel agnostic notification received by the notification approval module 602 may include metadata indicating the topic of the notification for comparison to the user information from the electronic marketplace and determine relevancy to the user.

In accordance with at least one embodiment, the notification approval module 602 may utilize a content approval service or filtering algorithm to ensure that the notification is appropriate for the user. For example, the notification approval module 602 may utilize several policies maintained by itself or provided by a filtering service to verify that age appropriate and content appropriate notifications are being provided to a user (do not allow notifications about adult novels to be approved for delivery to users that are underage). An appropriate or relevant notification would be a notification that includes information, or is about a topic, that conforms to information obtained about the user from an associated electronic marketplace. For example, if a user's purchase history indicates that they browse and shop for shoes and watches, an inappropriate notification would include purchase information for a laptop computer, while an appropriate notification would include purchase information or general release information about new watches offered by the electronic marketplace. The notification approval module 602 may communicate with the data store 608 or the communication preferences module 600 to verify that a notification is not violating an explicit preference frequency or time preference specified by the user. In an embodiment, the notification approval module 602 may maintain or store notification overlap information corresponding to notifications that were provided for approval but ultimately denied based on content of frequency to the notification generators. The notification overlap information can be utilized by the notification generators to update the content and frequency with which certain notifications are being generated and provided to the message planner. The notification approval module 602 can prevent user fatigue and frustration by blocking notifications that are being provided by a plurality of generators, but that include similar subject matter or content for a given time duration. The time duration may be explicitly specified by the user in the UI provided by the communication preferences module 600 or implicitly specified by the user and learned by the machine learning module 604. The notification approval module 602 may be configured to provide the notification to the messaging plan module 532 once the notification has been approved.

In accordance with at least one embodiment, the messaging plan module 532 may be configured to generate or determine a cross-channel/multi-channel messaging plan for approved notifications/messages received from the notification approval module 602 and various notification generators. In accordance with at least one embodiment, the messaging plan module 532 determines the cross-channel messaging plan based at least in part on implicit and explicit user preferences as well as other user information associated with the user from an electronic marketplace. The cross-channel messaging plan may specify the particular channels and the time duration for providing the notification through the specified particular channels. Thus, although a channel agnostic notification was provided, the cross-channel messaging plan can specify multiple appropriate channels to provide the notification to the user that the user will increase the likelihood that the user will engage with the notification. In some embodiments, the messaging plan module 532 recognizes the special requirements of some notifications (such as customer service notifications) and prioritizes the notifications for special delivery through appropriate channels.

In accordance with at least one embodiment, the messaging plan module 532 may select an appropriate channel for providing the notification based on an analysis at a user level and a notification level. For example, the messaging plan module 532 enforces explicit user preferences such as opt-out decisions and an engagement score provided by the machine learning module 604 to select the appropriate channels for providing the notification. The messaging plan module 532 may utilize the engagement scores generated to a plurality of channels and compare the engagement score to a threshold to select the appropriate channels. In an embodiment, the messaging plan module 532 maintains and updates the threshold for comparison to the engagement score. For example, for notifications that are being provided with increased frequency but with similar content, the threshold may be increased to avoid flooding the user with unwanted notifications. The messaging plan module 532 may be configured to determine a user's implicit delivery time preference based on information provided by the particular channel rendering and delivery systems. The messaging plan module 532 and machine learning module 604 may maintain and update the user's implicit delivery time preference and utilize this information in updating or altering the cross-channel message plan for the user. As described above, the messaging plan module 532 may also utilize explicit delivery time preferences specified by the user via the communication preferences module 600.

In accordance with at least one embodiment, the messaging plan module 532 may determine the cross-channel message plan based on an approved notification (provided by the notification approval module 602), explicit communication preferences (provided by the communication preferences module 600), and an engagement score (determined by the machine learning module 604). As illustrated and described above, the messaging plan module 532 may annotate each approved notification with metadata that constitutes the determined message plan for providing the notification to the user. In accordance with at least one embodiment, the annotated metadata may include: the engagement score, optimal time period to send, and a notification expiry time. In some embodiments, for all channels where the engagement score meets the threshold, the notification is pushed into a channel-specific queue or to the channel rendering and delivery module 606 directly. In some embodiments, the messaging plan module 532 may utilize the updated metrics or user metrics obtained in response to the user engaging with a notification to determine a messaging delay between channels. For example, a user could receive and engage with an email notification recommending a laptop purchase but decide not to purchase at this time. The messaging plan module 532 may obtain the user metrics from the email channel and interpret that the user is still interested in laptops. At a later time, the same user may receive an application push notification for similar laptops included in the earlier received email which leads to the user purchasing a laptop. The messaging plan module 532 may use the above identified information for subsequent message plans that could indicate that the particular user in this use case prefers an email followed by a push app notification after a certain time period. Similarly, if the user had not responded or engaged with the first email notification, the messaging plan module 532 would interpret that the user is not interested in the content of the notification and not schedule or determine a cross-channel messaging plan for the notification involving any other channels.

In accordance with at least one embodiment, the machine learning module 604 may be configured to determine the engagement score for each channel and notification. The engagement score may correspond to a probability that the user will engage with the notification provided via the channel. As described above, the machine learning module 604 may be configured to enable or aid in determining the implicit user preferences regarding preferred delivery time (including start time and expiry time for a notification), preferred channels, and preferred topics or content of the notification. In accordance with at least one embodiment, the machine learning module 604 can calculate the implicit user preferences for a user or a plurality of users associated with the message planner as described herein. Further, the machine learning module 604 may utilize aggregate implicit user preferences to supply information for a particular user that lacks sufficient data to correctly determine their implicit preferences. As more information is obtained for the user that lacks sufficient data the aggregate implicit user preferences can be removed from any determination regarding the user.

In accordance with at least one embodiment, the channel rendering and delivery module 606 may be configured to render and deliver the notifications based on the message plan provided by the messaging plan module 532. The channel rendering and delivery module 606 may be configured to take the channel agnostic notification and translate or render the notification into a channel specific format and deliver the notification according to standards associated with the channel specific format to the user. The channel rendering and delivery module 606 may utilize APIs to discover notifications that are ready to be provided (via the queue described above). Additionally, a batch API may be utilized by channel rendering and delivery module 606 which collects or vends all notifications within a given time range from a specific notification generator, or a real-time API may be utilized that collects and provides the notifications to the user in a real-time manner (given time constraints specified in the cross-channel message plan or the provided metadata described above). In accordance with at least one embodiment, the channel rendering and delivery module 606 may be configured to determine an engagement score threshold (described above and in FIG. 3) for use by the messaging plan module 532 in determining whether to include a particular channel in the approved notification's message plan. The channel rendering and delivery module 606 may provide the user metrics or updated metrics representing the information obtained from the user engaging or not engaging with a provided notification to any of the modules 532, 600-606, or the user metrics data store 608. Each channel may provide the user/updated metrics via their own channel mechanisms. The information stored in the data store 608 may be accessed by the notification generators.

Figure 7:
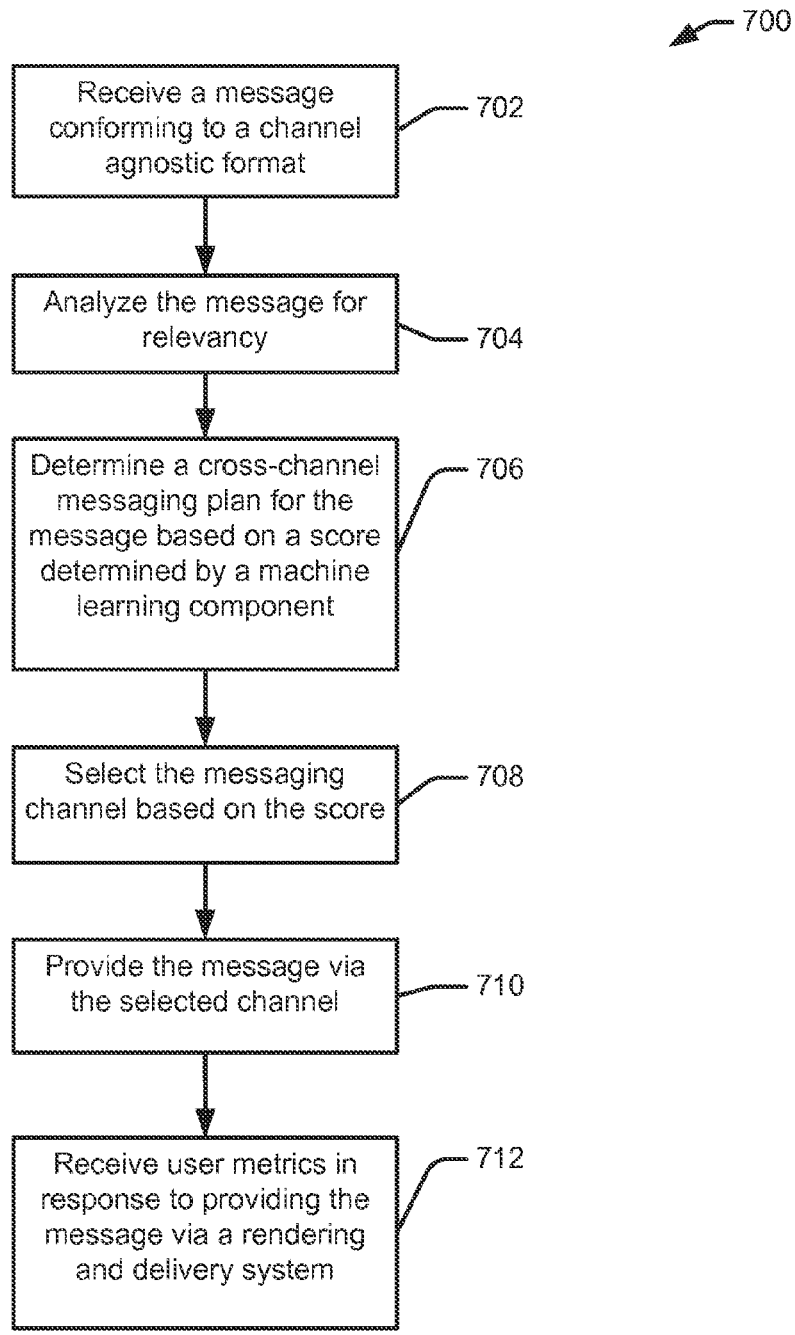
FIG. 7 is a flow diagram of an example process performed by the message plan module in accordance with at least one embodiment.
Figure 8:
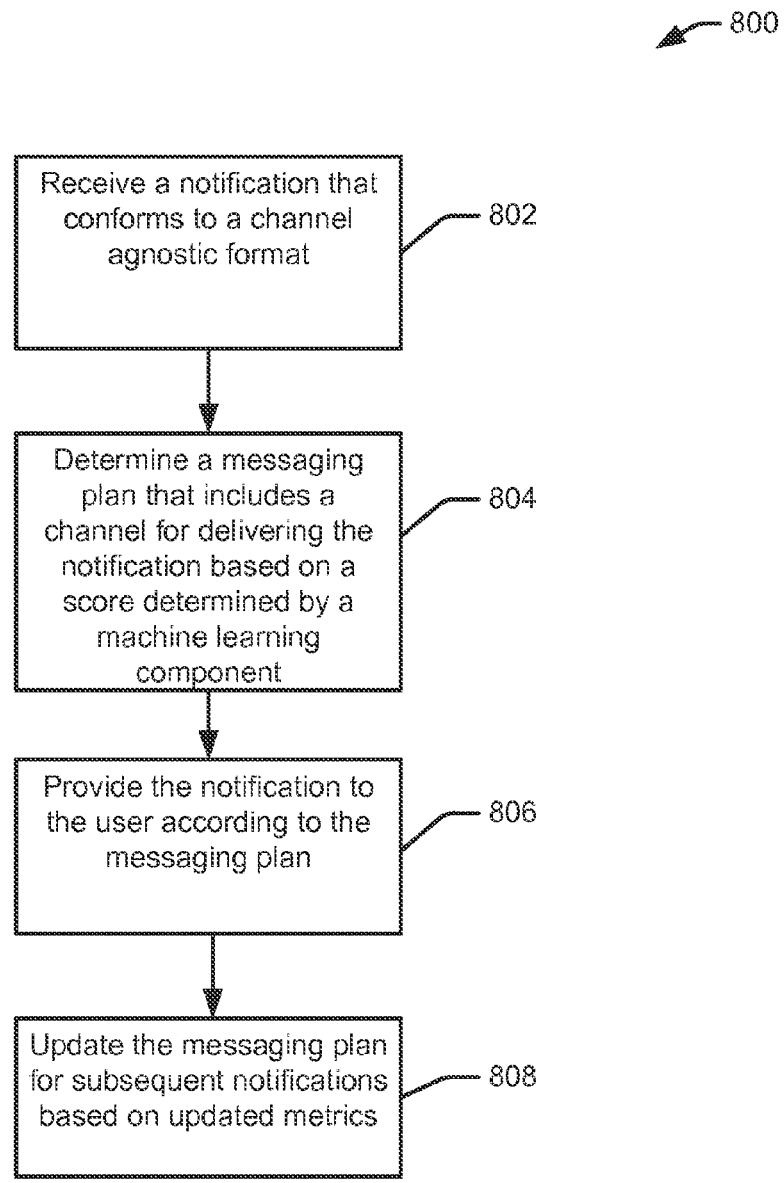
FIG. 8 is a flow diagram of another example process performed by the message plan module in accordance with at least one embodiment.

FIGS. 7 and 8 are flow diagrams depicting respective example processes 700 and 800 performed by, e.g., message plan module 532. These processes are illustrated in logical flow diagrams, each operation of which represents a sequence of operations that can be implemented in hardware or by computer instructions executed by hardware. In the context of computer instructions, the operations represent computer-executable instructions stored on one or more non-transitory computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a non-transitory computer-readable storage medium, for example, in the form of a computer program including a plurality of instructions executable by one or more processors.

In some examples, the one or more service provider computers 510 (e.g., utilizing at least one of the messaging plan module 532, the communication preferences module 600, the notification approval module 602, the machine learning module 604, and the channel rendering and delivery module 606 in communication with one or more data stores 608) shown in FIGS. 5 and 6, may perform the process 700 of FIG. 7. In FIG. 7 the process 700 may include receiving a message conforming to a channel agnostic format at 702. As described above, the message may be intended for a user associated with an electronic marketplace. The process 700 may include analyzing the message for relevancy to the user at 704. In accordance with at least one embodiment, the message may be determined to be relevant to the user based on a comparison of the content of the message and information associated with the user via the electronic marketplace (e.g., purchase or browsing history). The process 700 may include determining a cross-channel messaging plan for the message based at least in part on a score determined by a machine learning module at 706. The score can correspond to a probability that the user will interact with the message when provided via a particular messaging channel. The machine learning module may utilize feedback input or information indicating responses by the user to previously provided messages to determine the score. The feedback input can include the user's implicit preferences as described herein (e.g., inferring the type of notification the user wants to receive and from what channel the user wants to receive the notifications). In an embodiment, the machine learning module may utilize implicit preferences and explicit preferences to determine the score.

The process 700 may include selecting the messaging channel based on the score at 708. In an embodiment, either a particular messaging channel can be selected from a plurality of messaging channels or a plurality of messaging channels can be selected based at least in part on the score. The process 700 can include providing the message via the selected channel at 710. As described above, a rendering and delivery system associated with the particular messaging channel may provide the message. The process 700 may conclude at 712 by receiving message metrics in response to providing the message via the rendering and delivery system. The message metrics may correspond to the user/ updated metrics described above and may be utilized by the machine learning module in updating the cross-channel messaging plan for subsequent messages to the user.

With respect to FIG. 8, one or more service provider computers 510 (e.g., utilizing at least one of the messaging plan module 532, the communication preferences module 600, the notification approval module 602, the machine learning module 604, and the channel rendering and delivery module 606 in communication with one or more data stores 608) shown in FIGS. 5 and 6, may perform process 800. In FIG. 8 the process 800 may include receiving a notification that conforms to a channel agnostic format at 802. The process 800 may include determining a messaging plan that includes a channel for delivering the notification based on a score determined by a machine learning module at 804. The process 800 may include providing the notification to the user according to the messaging plan at 806. As described above, a rendering and delivery system associated with the selected channel or the channel included in the messaging plan may provide the notification to the user. The process 800 may conclude at 808 by updating the messaging plan for subsequent notifications based on updated metrics of the user. In accordance with at least one embodiment, the updated metrics of the updated metrics of the user may be received in response to the user interacting with the notification and may be provided by the channel's rendering and delivery system.

Figure 9:
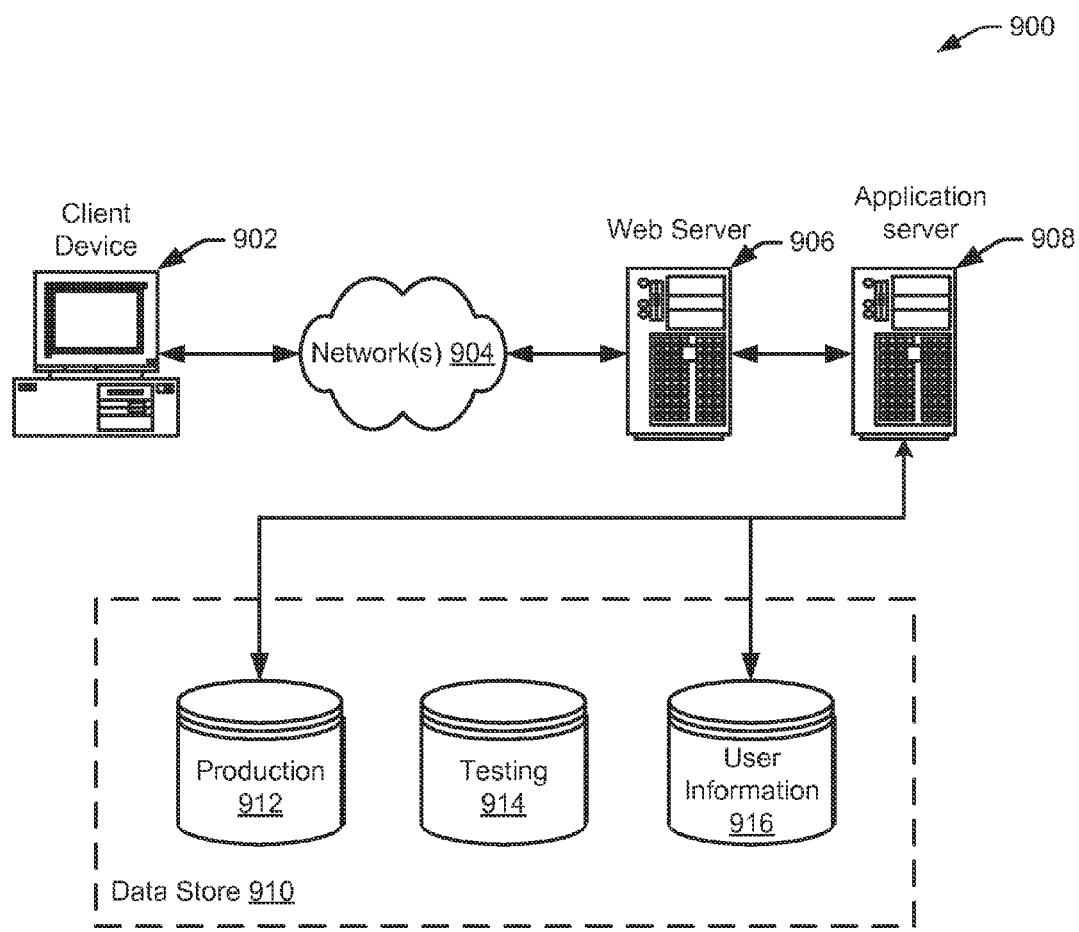
FIG. 9 is a block diagram of another example networked operating environment in which various embodiments of the message planner can be implemented in accordance with at least one embodiment.

FIG. 9 is a block diagram depicting another example networked operating environment 900 for implementing various embodiments of the present disclosure. As will be appreciated, although a web-based environment is depicted in FIG. 9, different environments may be used, as appropriate, to implement various embodiments. The environment 900 includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, wearable computing devices, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. For example, the application server may implement a notification generator and message planner such as those shown in FIG. 1 in order to generate notifications and deliver the notifications to a user via various channels in accordance with a message plan. The application server may also provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 902 and the application server 908, can be handled by the web server. It should be understood that the web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis or other such purposes. The data store 910 may also include the user information and metrics used to generate a message plan in accordance with the present disclosure. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a network page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more network applications that may be implemented as one or more scripts or programs written in any programming language, such as JAVA®, C, C# or C++, or any scripting language, such as Perl, Python or TCL, as well as combinations thereof. The server(s) may also include database servers, including without limitation those commercially available from Oracle Corporation, Microsoft Corporation, SAP AG and International Business Machines Corporation.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or illustrative language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
   receiving, by a computer system, a message intended for a user associated with an electronic marketplace, the message conforming to a channel agnostic format;
   analyzing the message for relevancy to the user based at least in part on information associated with the user via the electronic marketplace;
   calculating a score based at least in part on machine learning utilizing input indicating an interaction by the user with previously provided messages, the score corresponding to a probability that the user will interact with the message when provided via a particular message channel of a plurality of message channels, a unique message channel of the plurality of message channels being unique with respect to other unique message channels;
   determining, by the computer system, a cross-channel messaging plan for the message and the user based at least in part on the score and the relevancy of the message to the user, the cross-channel messaging plan identifying one or more message channels of the plurality of message channels and a delivery time period of a plurality of delivery time periods to associate with the unique message channel of the one or more message channels;
   selecting the particular messaging channel from the plurality of messaging channels based at least in part on the score;
   providing the message to the user via a delivery system associated with the particular messaging channel;
   in response to providing the message to the user,
      receiving a metric associated with the user; and
      updating the cross-channel messaging plan for a subsequent message to the user based at least in part on the metric.

2. The computer-implemented method of claim 1, wherein the machine learning utilizes the information associated with the user via the electronic marketplace and implicit user preferences obtained from the user interacting with provided messages to generate the score.

3. The computer-implemented method of claim 1, wherein determining the cross-channel messaging plan for the message and the user is further based at least in part on implicit user preferences and explicit user preferences, the implicit user preferences obtained by analyzing the metric associated with the user.

4. The computer-implemented method of claim 3, wherein the particular messaging channel comprises at least one of an email channel, a short message service (SMS) channel, a telephone channel, a mobile telephone channel, or a stand-alone application channel.

5. The computer-implemented method of claim 1, wherein the channel agnostic format of the message includes information indicating at least one of a type of message, an identifier for the user, a start time period, an expire time period, metadata associated with a category of an item offered by the electronic marketplace, metadata associated with a value of the item offered by the electronic marketplace, or electronic marketplace attributes.

6. The computer-implemented method of claim 1, wherein the cross-channel message plan includes metadata for each messaging channel of the plurality of messaging channels, the metadata identifying at least one of the score, an optimal delivery time period, and an expiration time period.

7. A non-transitory computer-readable storage medium storing computer-executable instructions that, when executed by a computer system, configure the computer system to perform operations comprising:
   receiving a notification that conforms to a channel agnostic format;
   determining a messaging plan that identifies a channel of a plurality of channels and a delivery time period of a plurality of delivery time periods associated with the channel for delivering the notification to a user, said determining based at least in part on a score measuring engagement by the user with the notification provided via the channel, the channel being unique with respect to other channels of the plurality of channels;

providing the notification via the channel identified in the messaging plan; and updating the messaging plan for at least one subsequent notification based at least in part on a metric representing the user that is determined in response to the user engaging with the notification.

8. The non-transitory computer-readable storage medium of claim 7, wherein providing the notification to the user via the channel identified in the messaging plan includes providing the notification to a channel notification queue.

9. The non-transitory computer-readable storage medium of claim 8, wherein a delivery system accesses the notification from the channel notification queue using a first application programming interface (API) that accesses all provided notifications in the channel notification queue during a specific time period or using a second API that accesses a notification immediately upon being provided to the channel notification queue.

10. The non-transitory computer-readable storage medium of claim 9, wherein the delivery system translates the notification from the channel agnostic format to a channel specific format.

11. The non-transitory computer-readable storage medium of claim 7, wherein determining the messaging plan is further based at least in part on the score satisfying a threshold.

12. The non-transitory computer-readable storage medium of claim 11, wherein the threshold is unique to the notification and the user.

13. The non-transitory computer-readable storage medium of claim 7, wherein determining the messaging plan is further based at least in part on an implicit delivery time preference of the user that is determined based at least in part on the metric representing the user.

14. The non-transitory computer-readable storage medium of claim 7, wherein the metric representing the user indicates at least one of a preferred notification channel, a preferred delivery time, or a preferred content of the notification.

15. A computer system comprising:
a memory configured to at least store computer-executable instructions, and
a processor in communication with the memory and configured to execute the computer-executable instructions to at least:
analyze a message for relevancy to a particular user based at least in part on metadata associated with the message and information associated with the particular user;
generate a score by applying machine learning to a metric associated with the particular user, the score corresponding to a probability that the particular user interacts with the message delivered via a channel of a plurality of channels during a time period of a plurality of time periods associated with the channel, the channel being unique with respect to other channels of the plurality of channels;
determine the channel and the time period for delivering the message to the particular user based at least in part on the score and the relevancy of the message to the particular user;
deliver the message to the particular user via the channel during the time period; and
in response to the user interacting with the message that is delivered,
receive an updated metric associated with the particular user, and
determine and updated channel and an updated time period for delivering a subsequent message to the user based at least in part on the updated metric.

16. The computer system of claim 15, wherein the processor is further configured to execute the specific computer-executable instructions to at least analyze the message to obtain topic information of the message and determine frequency of other messages with similar topic information.

17. The computer system of claim 16, wherein analyzing the message for relevancy to the particular user is further based at least in part on the determined frequency of other messages with similar topic information.

18. The computer system of claim 15, wherein the processor is further configured to execute the specific computer-executable instructions to at least maintain aggregated information for users regarding channels preferred by the users and delivery times preferred by the users.

19. The computer system of claim 18, wherein the processor is further configured to execute the specific computer-executable instructions to at least utilize the aggregated information to generate the score for the particular user when the metric associated with the particular user are insufficient.

20. The computer system of claim 15, wherein the processor is further configured to execute the specific computer-executable instructions to at least prioritize the message with reference to the particular user, the message being one of a plurality of messages intended for the particular user, the prioritization of the message based at least in part on the relevance of the message to the particular user.

* * * * *